(12) United States Patent
Glazko et al.

(10) Patent No.: US 7,113,792 B2
(45) Date of Patent: Sep. 26, 2006

(54) MOBILE STATION LOCATION

(75) Inventors: Serguei Glazko, San Diego, CA (US); Sanjay K. Jha, San Diego, CA (US); Paul Jacobs, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 10/375,163

(22) Filed: Feb. 25, 2003

(65) Prior Publication Data

US 2004/0063439 A1  Apr. 1, 2004

Related U.S. Application Data

(60) Provisional application No. 60/415,358, filed on Oct. 1, 2002.

(51) Int. Cl.
*H04Q 7/20* (2006.01)

(52) U.S. Cl. ............... 455/455; 455/442.1; 455/422.1; 455/456.1; 455/456.3; 455/432.1; 455/435.1

(58) Field of Classification Search ................ 455/455, 455/442.1, 456.1, 552.1, 404.1, 432.1, 435.1, 455/433, 422.1, 456.3; 370/338, 349, 328
See application file for complete search history.

(56) References Cited

U.S. PATENT DOCUMENTS

| | | | | |
|---|---|---|---|---|
| 5,845,081 A * | 12/1998 | Rangarajan et al. | ........ | 709/224 |
| 5,900,838 A * | 5/1999 | Khan et al. | ................. | 342/457 |
| 6,140,964 A * | 10/2000 | Sugiura et al. | ............ | 342/464 |
| 6,230,015 B1 * | 5/2001 | Kinnunen et al. | .......... | 455/450 |
| 6,393,294 B1 | 5/2002 | Perez-Breva et al. | ....... | 455/456 |
| 6,414,635 B1 * | 7/2002 | Stewart et al. | .............. | 342/457 |
| 6,807,421 B1 * | 10/2004 | Ahmavaara | ................. | 455/438 |
| 2001/0053698 A1 * | 12/2001 | Karmi et al. | ............... | 455/456 |
| 2002/0191554 A1 * | 12/2002 | Kondo | ....................... | 370/328 |
| 2003/0022674 A1 * | 1/2003 | Shintai et al. | .............. | 455/456 |
| 2003/0142643 A1 * | 7/2003 | Yang et al. | ................. | 370/328 |
| 2003/0156558 A1 * | 8/2003 | Cromer et al. | ............. | 370/331 |
| 2003/0176190 A1 * | 9/2003 | Mohebbi et al. | ............ | 455/436 |
| 2003/0220105 A1 * | 11/2003 | Daigremont et al. | ....... | 455/424 |
| 2003/0222819 A1 * | 12/2003 | Karr et al. | .................. | 342/457 |
| 2004/0170153 A1 * | 9/2004 | Stewart et al. | ............. | 370/338 |
| 2004/0180671 A1 * | 9/2004 | Spain, Jr. | ................. | 455/456.1 |

* cited by examiner

*Primary Examiner*—George Eng
*Assistant Examiner*—Khai Nguyen
(74) *Attorney, Agent, or Firm*—Philip R. Wadsworth; Charles D. Brown; James D. McFarland

(57) ABSTRACT

A method for localizing a mobile station, which in one embodiment is characterized by logging one or more wireless channels which belong to one or more network providers other than the mobile station's home network provider and which substantially currently provide communication with one or more discernable base stations; and establishing a geographic position of the mobile station by use of the one or more wireless channels which belong to the one or more network providers other than the mobile station's home network provider. In one or more various embodiments, related systems include but are not limited to circuitry and/or programming for effecting the foregoing-referenced method embodiment, the circuitry and/or programming can be virtually any combination of hardware, software, and/or firmware configured to effect to foregoing-referenced method embodiment depending upon the design choices of the system designer.

39 Claims, 10 Drawing Sheets

ENVIRONMENT

ENVIRONMENT

MOBILE STATION LOCATION

RELATED APPLICATIONS

This application claims priority to U.S. Provisional Application No. 60/415,358, filed on Oct. 1, 2002.

BACKGROUND

1. Technical Field

The present application relates, in general, to wireless data communications systems.

2. Description of the Related Art

Data is information that is in any form suitable to manipulation and/or processing in a formalized manner, such as by one or more machines. Wireless data communications systems are systems wherein data communications stations transmit and/or receive data through at least one wireless data communications link (e.g., through the air or through a vacuum).

One type of wireless data communications system is a mobile wireless data communications system. In mobile wireless data communications systems at least one of the data communications stations is a mobile station. Typically, mobile wireless data communications systems are often comprised of one or more base stations and one or more mobile stations. A base station is a data communications station which is geographically fixed and which is typically made up of antennas, amplifiers, receivers, and transmitters, and similar hardware and software for sending and receiving signals and converting between radio frequency (RF) waves and audio signals. An example of a base station is a cellular base station that communicates with cell phones currently located in the geographic area (i.e., cell) within which the base station can intelligently send and receive signals.

A mobile station is a data and/or voice communications station intended to be used while in motion or during halts at unspecified points and which is typically made up of an antenna, amplifier, receiver, transmitter, and similar hardware and software for sending and receiving signals and converting between RF waves and audio signals. Examples of mobile stations are cellular devices such as global system for mobile communications (GSM) devices, frequency division multiple access (FDMA) devices, time division multiple access (TDMA) devices, code division multiple access (CDMA) devices, wideband code division multiple access (WCDMA) devices, and analog mobile phone system (AMPS) devices.

There are many uses for mobile wireless data communications systems. One such use is the determination of a previously unknown geographic localization of a mobile station based on information gleaned from one or more data communications stations whose geographic locations are either known or knowable (e.g., whose locations may not be presently known, but whose locations can be determined via defined techniques).

Those having ordinary skill in the art will appreciate that there is a continuing need to increase the accuracy of the geographic localizations of mobile stations. Accordingly, one aspect of the present disclosed subject matter is to increase the accuracy of the geographic localization of mobile stations.

BRIEF SUMMARY

A method for localizing a mobile station, which in one embodiment is characterized by: logging one or more wireless channels which belong to one or more network providers other than the mobile station's home network provider and which substantially currently provide communication with one or more discernable base stations; and establishing a geographic position of the mobile station by use of the one or more wireless channels which belong to the one or more network providers other than the mobile station's home network provider.

A method for localizing a mobile station, which in one embodiment is characterized by: selecting a first wireless mode of the mobile station; logging one or more first wireless mode channels which provide communication with one or more discernable base stations, the logging irrespective of one or more network providers to whom the first wireless mode channels belong; and establishing a geographic position of the mobile station by use of the logged one or more first wireless mode channels.

A method, which in one embodiment is characterized by: receiving a request for geographic information of a base station whose network provider is unknown to a mobile station having an associated network provider; and transmitting the geographic information of the base station whose network provider is unknown in response to the receiving.

A method for establishing a geographic position of a mobile station by use of one or more wireless channels which belong to one or more network providers other than the mobile station's home network provider, which in one embodiment is characterized by: receiving identification of one or more base stations discernable by the mobile station; retrieving one or more geographic locations of the one or more base stations discernable by the mobile station; and calculating the geographic position of the mobile station by use of the geographic locations of the one or more base stations.

A method of localizing a mobile station associated with a home network provider, which in one embodiment is characterized by: receiving location information originated by the home network provider associated with the mobile station and location information from at least one other network provider that is not the home network provider; and determining a geographic position from the received location information originated by the home network provider and the at least one other network provider that is not the home network provider.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE SEVERAL VIEWS OF THE DRAWINGS

The use of the same symbols in different drawings typically indicates similar or identical items.

DETAILED DESCRIPTION

Figure 1:
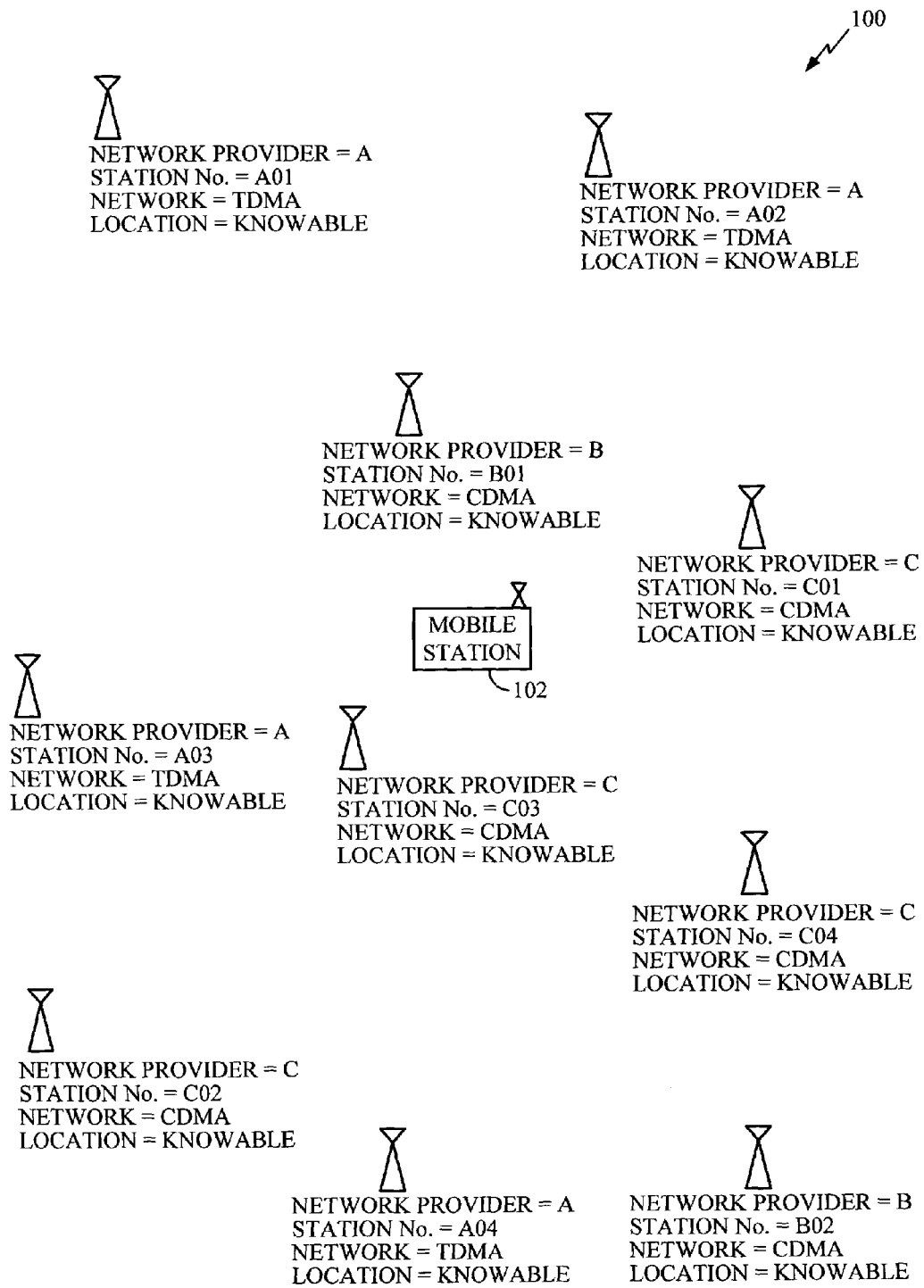
FIG. 1 is a schematic diagram of an environment in which aspects of the subject matter of the present application may be practiced.

FIG. 1 shows an environment 100 in which aspects of the subject matter of the present application may be practiced. Depicted are a number of base stations—which are illustrated as owned and maintained by three separate network providers A, B, and C—in the midst of which is located mobile station 102. In one implementation mobile station 102 is a multiband wireless device (e.g., a cellular telephone capable of operating on an 800 MHz band and a 1900 MHz band), while in another implementation mobile phone 102 is a multimode device (e.g., a cellular telephone capable of operating in two or more different modes (e.g., CDMA, WCDMA, AMPS, TDMA, FDMA, High Data Rate (HDR) and/or GSM networks)).

In the example environment 100, the network provider A maintains four base stations: base station No. A01, base station No. A02, base station No. A03, and base station No. A04 in a TDMA-type network. The geographic locations of the various base stations provided and/or maintained by network provider A are knowable. As used herein, "knowable," in one implementation, means that mobile station 102 is actually a subscriber to a network provided by a particular network provider, in which case the physical location information of a particular base station is directly provided to mobile station 102 by its network provider. In another implementation, "knowable," means that, although mobile station 102 is not a subscriber to a particular network with which mobile station 102 is communicating, the network with which mobile station 102 is communicating supplies the physical location information of its base stations to mobile station 102 (e.g., such as in the case where network providers have previously agreed to supply such information between their various subscribers). In yet another implementation, "knowable," means that, although mobile station 102 is not a subscriber to a particular network with which mobile station 102 is communicating, mobile station 102 is able to obtain the geographic position of the base station from a trusted third party (e.g., a computational entity provided by a company which has previously contracted with network providers such that the trusted third party can supply base station location information to various requesters, in response to information such as a base station ID, network type (e.g., TDMA, CDMA, WCDMA, GSM, AMPs, HDR, etc), and/or frequency type without revealing the identity of the network provider which owns a base station for which such geographic location information is being requested/provided).

In the exemplary environment 100, network provider B maintains two base stations: base station No. B01, and base station No. B02 in a CDMA-type network. The geographic locations of the various base stations provided and/or maintained by network provider B are knowable.

In the exemplary environment 100, network provider C maintains four base stations: base station No. C01, base station No. C02, base station No. C03, and base station No. C04 in a CDMA-type network. The geographic locations of the various base stations provided and/or maintained by network provider C are knowable.

While CDMA and TDMA-type networks have been shown herein for sake of illustration, those having ordinary skill in the art will appreciate that many other types of networks can be utilized, such as GSM, FDMA, or AMPS-type networks. With respect to the subject matter of the present application, so long as mobile station 102 can receive transmission from a base station in a fashion such that the distance from mobile station 102 to the base station 102 may be derived, the network can be of virtually any type. In addition, although cellular telephones have been discussed above as a type of mobile device 102, substantially any type of wireless device may be used within the spirit of the subject matter of the present application, so long as such wireless device can receive transmissions from base stations (e.g., wireless PDAs, wireless pagers and data processing systems utilizing wireless modems).

Figure 2A:
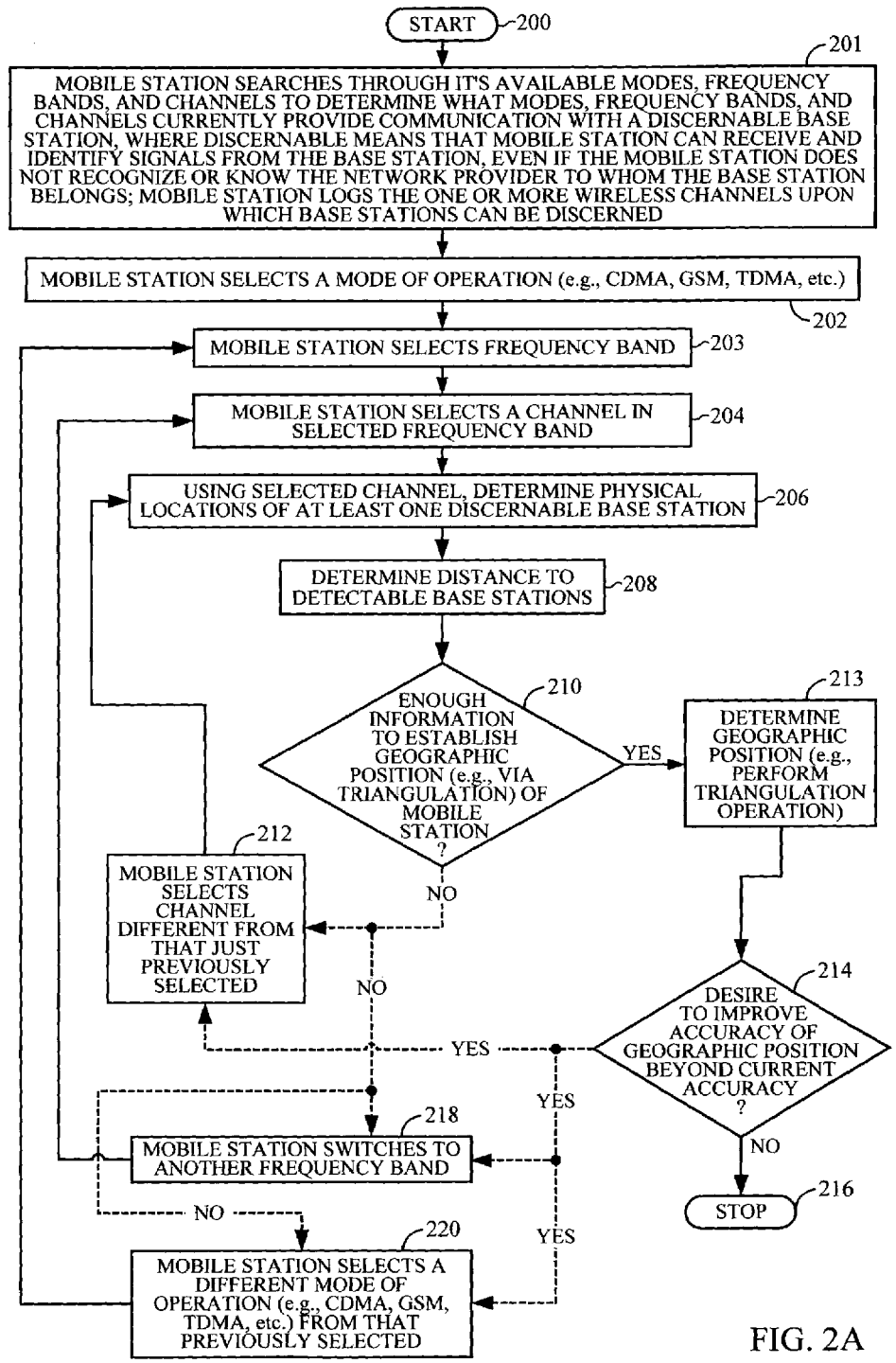
FIG. 2A is a high-level logic flowchart depicting various implementations of various processes which may be individually and/or collectively carried out within an environment of FIG. 1.

FIG. 2A shows a high-level logic flowchart depicting various implementations of various processes which may be individually and/or collectively carried out within environment 100 of FIG. 1. Method step 200 depicts the start of the process. In step 201, in one implementation, the mobile station 102 searches through its available modes, frequency bands, and channels to determine what modes, frequency bands, and channels currently provide communication with at least one discernable base station. As used herein, a "discernable base station" indicates that a mobile station can receive and identity signals from The base station, even if the mobile station does not recognize or know the network provider to whom the base station belongs, and log the one or more wireless channels upon which base stations can be discerned.

In step 202, the mobile station 102 selects a mode of operation, such as CDMA mode, GSM mode, TDMA mode, AMPS mode, HDR mode, etc., which has one or more wireless channels upon which base stations can be discerned (e.g., such as those logged in method step 201).

In step 203, the mobile station 102 selects a frequency band used by the selected mode of operation (e.g., used by mobile station 102 when operating in CDMA, WCDMA, GSM, TDMA, AMPS, HDR, etc. mode).

In step 204, the mobile station 102 selects a channel used within the selected frequency band (e.g., a transmit/receive channel frequency in TDMA, or GSM-type systems, or a pilot channel in CDMA-type systems).

In step 206, the mobile station 102 uses the selected channel, which can include determining the physical location of a detected base station.

Those skilled in the art will appreciate that, while many operations are described herein as occurring within/at specific physical components for sake of conceptual clarity, in actuality such operations will typically take place at/within other specific physical components in either a centralized or distributed fashion. For example, while many computational operations herein will be described as occurring at/within mobile station 102, those having ordinary skill in the art will appreciate that in most actual systems such computational operations will be performed, in large part, using computational circuitry and/or programming resident within or near one or more base stations with which mobile station 102 is communicating (e.g., the "thin client" approach used in many wireless systems). Consequently, those having ordinary skill in the art will appreciate that the physical locations of the various computations and/or operations described herein are generally merely exemplary, and that the actual physical locations, circuitry, and programming used to perform such operations are design choices within the purview of the system designer. As a consequence of the foregoing, from the standpoint of the subject matter of the present application, if a certain physical device has circuitry which performs at least a part of the process described herein, for all intents and purposes that device can be viewed as performing all of the various computations and/or operations which may actually be distributed among the various physical devices.

In step 208, the mobile station 102 determines the physical distance between itself and the discernable base station (usually the base station having the strongest frequency on the selected channel).

In step 210, the mobile station 102 determines whether or not the mobile station 102 has enough information to localize its geographical position (e.g., enough information to perform a triangulation operation). Those having ordinary skill in the art will appreciate that mobile station 102 can relatively accurately determine its physical position so long as mobile station 102 knows its physical distance from at least three base stations whose geographic locations are known via an operation known as "triangulation". In one implementation, in the event that the determination of step 210 is that NOT enough information is known to localize the geographical position of mobile station 102, the process proceeds to step 212 where the mobile station 102 selects a channel different from that just previously selected (e.g., by switching to different frequency channels in TDMA or GSM-type systems, or switching to different pilot channels in CDMA-type systems). Thereafter, the process proceeds to step 206, after which the process proceeds in the fashion described herein.

In the event that the determination of step 210 is that enough information is known to localize the geographical position of mobile station 102 (e.g., the distances from at least 3 base stations whose geographic coordinates are known, if triangulation is being utilized), the process proceeds to step 213. In step 213, the geographic position of mobile station 102 is determined (e.g., mobile station 102 uses triangulation to calculate its own position).

In step 214, a determination is made as to whether or not it is desired to improve the accuracy of the localization of geographic position beyond the current level of accuracy (e.g., by obtaining the location of at least one more base station and the distance therefrom, when mobile station 102 is relying on triangulation). In one implementation, the process terminates at step 216 if it is determined that increased accuracy of localization of geographic position beyond the current level of accuracy is NOT desired.

If it is determined that an increase in accuracy of the localization geographic position beyond the current level of accuracy is desired, the process proceeds to step 212 and continues in the fashion described herein.

In an alternate implementation, in the event that the determination of step 210 is that NOT enough information is known to localize the geographical position of mobile station 102, the process proceeds to step 218 where the mobile station 102 selects a frequency band different from that just previously selected. For example, the mobile station 102 may switch from an 800 MHz frequency band to an 1900 MHz frequency band; where in one implementation, the new frequency band is owned by the same network provider who owned the previous frequency band, while in another implementation the new frequency band is owned by a different network provider. Thereafter, the process proceeds to step 204 and continues as described herein.

In an alternate implementation, in the event that the determination of step 214 is that improved accuracy of the localization geographic position beyond the current level of accuracy is desired, the process proceeds to step 218. In step 218, the mobile station 102 selects a frequency band different from that just previously selected. Thereafter, the process proceeds to step 204 and continues in the fashion as described herein.

In a further alternate implementation, in the event that the determination of step 210 is that NOT enough information is known to localize the geographical position of mobile station 102, the process proceeds to step 220. In step 220, the mobile station 102 selects a mode of operation, such as a CDMA, GSM, TDMA, AMPS, etc., where the mode selected is different from that just previously selected. Thereafter, the process proceeds to step 203, and continues in the fashion as described herein.

In a further alternate implementation, in the event that the determination of step 214 is that it is desired to improve the accuracy of the localization of geographic position beyond the current level of accuracy, the process proceeds to step 220. In step 220, the mobile station 102 selects a mode of operation, such as a CDMA, GSM, TDMA, AMPS, etc., where the mode selected is different from that just previously selected. Thereafter, the process proceeds to step 203 and continues in the fashion as described herein.

Figure 2B:
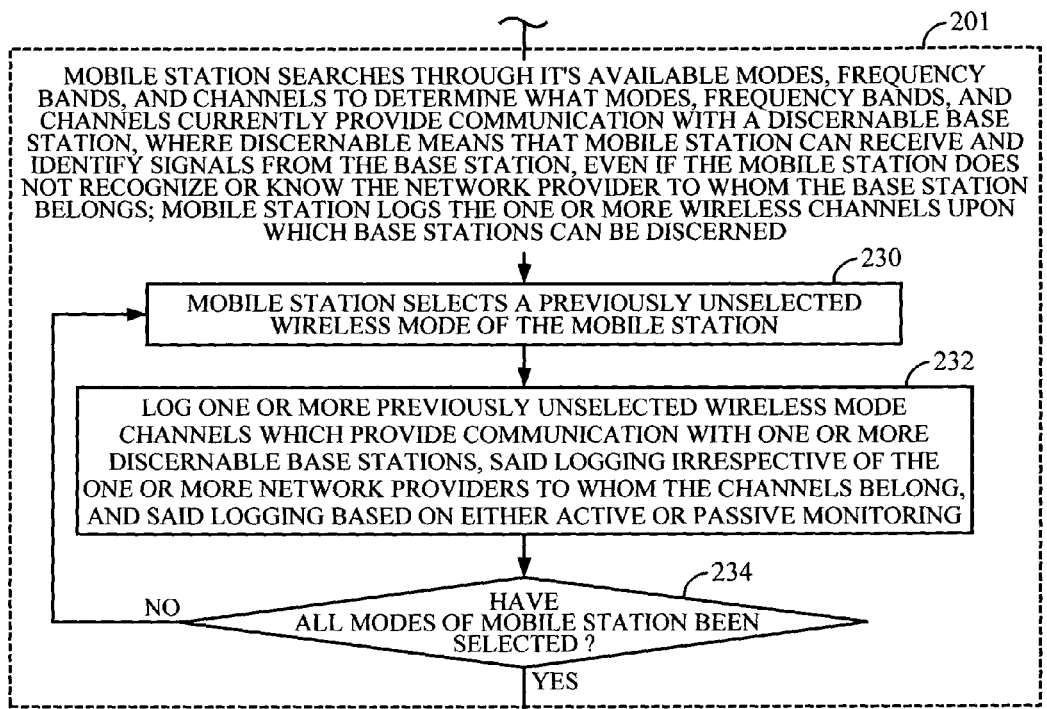
FIG. 2B is a high-level logic flowchart depicting an alternate implementation of the high-level logic flowchart of FIG. 2A.

FIG. 2B is a high-level logic flowchart depicting an alternate implementation of the high-level logic flowchart of FIG. 2A. In one illustrated implementation, step 201 includes sub-steps 230–234. In step 230, mobile station 102 selects a previously unselected wireless mode of the mobile station 102. In step 232, the mobile station 102 logs one or more previously unselected wireless mode channels which provide communication with one or more discernable base stations (e.g., discernable base stations will be logged even when mobile station 102 does not know the network provider of the base stations), said logging irrespective of the one or more network providers to whom the channels belong, and said logging based on either active or passive monitoring (e.g., either listening as in CDMA systems, or sending out a broadcast and asking for base stations to respond as in TDMA/GSM systems). In step 234, the mobile station 102 determines if there are additional modes to select. Thus, the selecting step 230 and the logging step 232 are repeated until all wireless modes of the mobile station have been selected. The remaining steps of the alternate implementation of the high-level logic flowchart function as described herein.

Figure 2C:
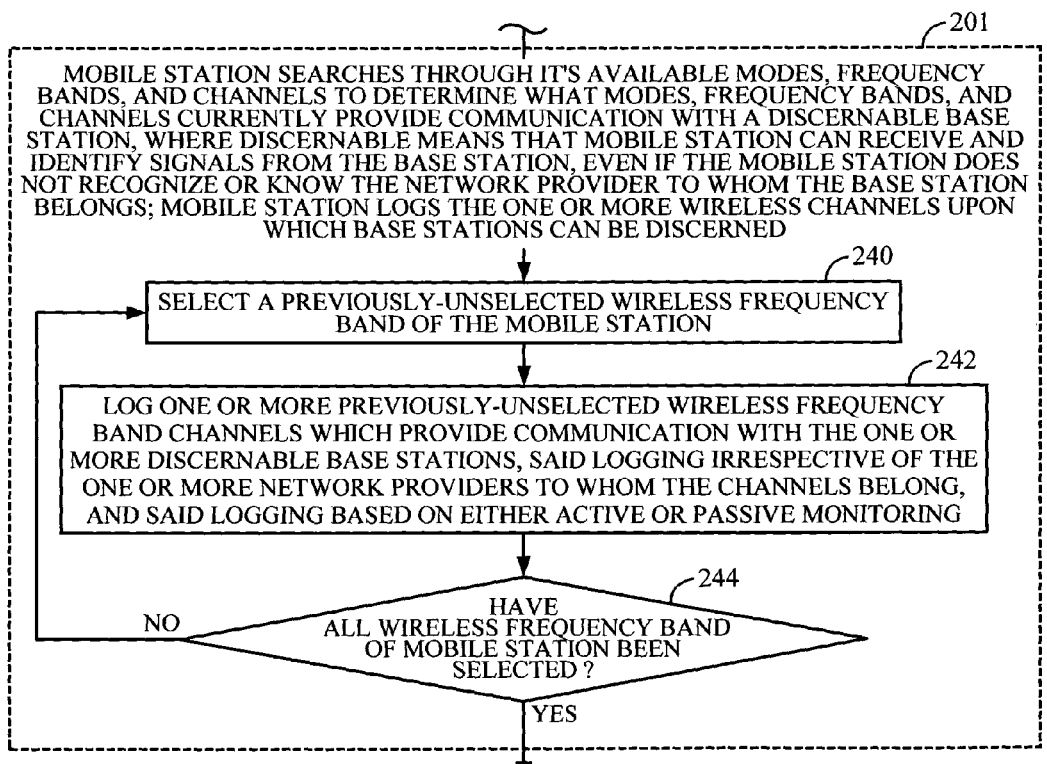
FIG. 2C is a high-level logic flowchart depicting an alternate implementation of the high-level logic flowchart of FIG. 2A.

FIG. 2C is a high-level logic flowchart depicting an alternate implementation of the high-level logic flowchart of FIG. 2A. As illustrated step 201 includes a number of sub-steps 240–244. In step 240, the mobile station 102 selects a previously unselected wireless frequency band of the mobile station. In step 242, the mobile station 102 logs one or more previously-unselected wireless frequency band channels which provide communication with the one or more discernable base stations. The logging is irrespective of the one or more network providers to whom the channels belong, and the logging is based on either active or passive monitoring. In step 244, the mobile station 102 determines if there are additional wireless frequency bands to select. Thus, the selecting step 240 and the logging step 242 are repeated until all wireless frequency bands of the mobile station have been selected. The remaining steps of the alternate implementation of the high-level logic flowchart function as described herein.

In yet another alternate implementation (not shown) of step 210, cellular and PCS networks are operated by different network providers that have roaming agreement between them. This means mobile station 102 will generally have all information about the "competing" systems prestored. Hence, in this situation, mobile station 102 will sometimes not attempt to search for base stations, unless mobile station 102 needs to perform a position location function such as described here. In this special case, mobile station 102 may change its ordinary procedures and perform a search of alternative systems. Those having ordinary skill in the art will appreciate that information about the alternative systems could be either stored in local memory of the mobile station 102 and/or delivered to mobile station 102 via messaging by a network where position location requires minor amendment to standard network operating procedures. Those having ordinary skill in the art will appreciate that there are different ways of actually implementing the herein-described search mechanism. For example, such search mechanism can be a real time search that requires tuning to a new frequency along with real time signal processing. Or such search mechanism may be a buffer search approach where mobile station 102 tunes to a new frequency and stores a segment of signal sufficient for post processing. Mobile station 102 then can tune back to its serving channel or system and perform off-line searching of the stored signal segment. Those skilled in the art will appreciate that CDMA is suitable for the foregoing-referenced kinds of operations.

Figure 2D:
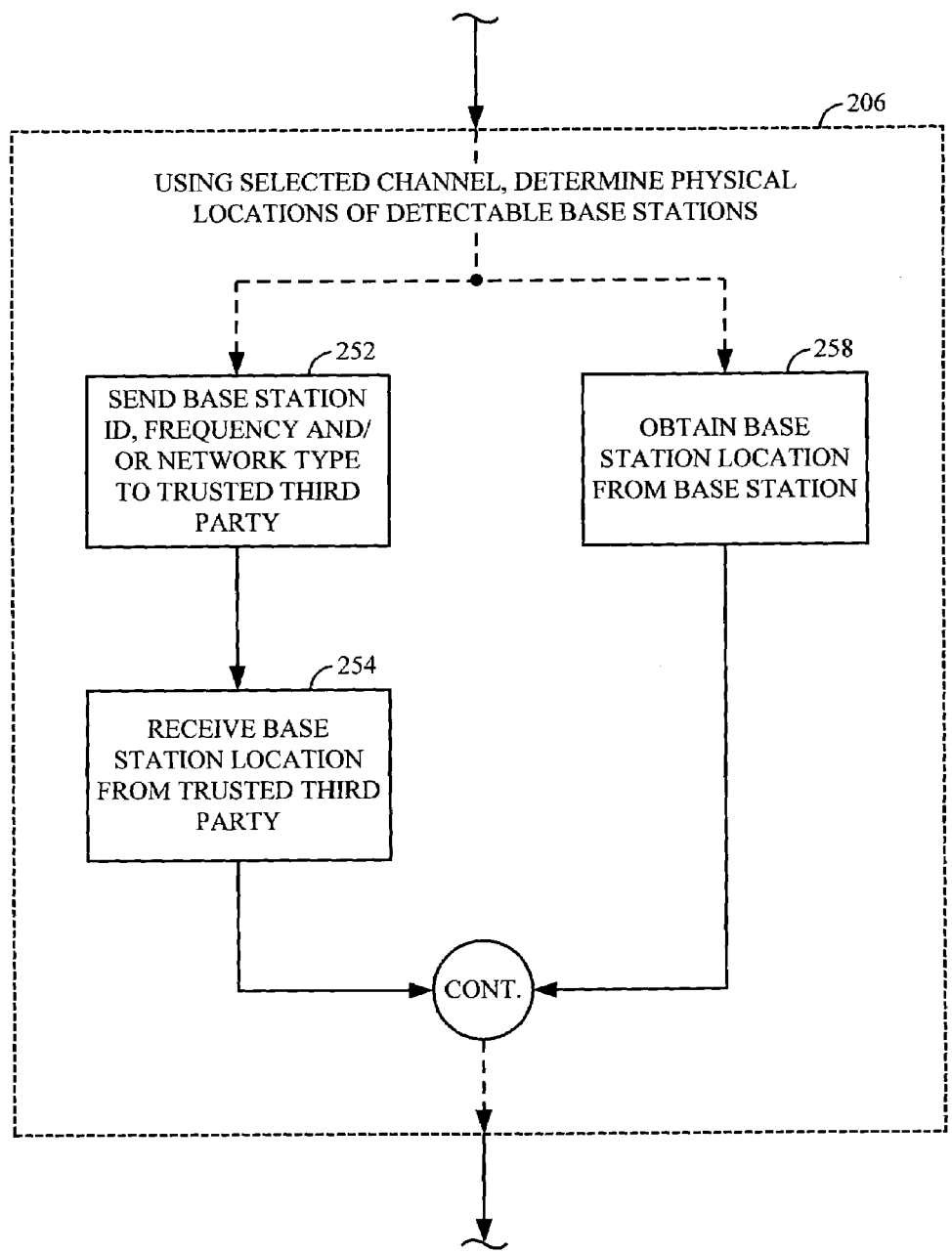
FIG. 2D is a high-level logic flowchart depicting alternate implementations of the process depicted in FIG. 2A.

FIG. 2D is a high-level logic flowchart depicting alternate implementations of the process depicted in FIG. 2A. As illustrated, step 206 includes a number of sub-steps 252–254. In step 252, the mobile station 102, subsequent to obtaining a base station ID on the selected frequency, sends the base station ID, selected frequency, and/or network type to a trusted third party which serves as a repository of geographic location data. For example, those having ordinary skill in the art will recognize that base station geographic locations are typically kept confidential, and that network providers generally prefer not to give out the geographic locations of their base stations. Accordingly, one implementation employs a trusted third party is used to ensure that the geographic locations of various base stations can be delivered without identifying the network provider owning such base stations. The trusted third party can be a computational/business entity who has access to the geographic locations of the base stations of many network providers, but who is also under a contractual obligation to maintain confidentiality as to the network providers of the various base stations. Typically, mobile station 102 will communicate with the trusted third party over the mobile station's 102 home network.

In step 254, the mobile station 102 receives the base station geographic location from the trusted third party. The remaining steps of the alternate implementation of the high-level logic flowchart function as described herein.

In another implementation, in step 258 mobile station 102 obtains the base station geographic location directly from the base station with which the mobile station 102 is communicating. This implementation is typically used when the mobile station 102 is communicating with a base station in its home network (e.g., either its permanently assigned home network provider or its temporarily assigned roaming network provider). The remaining steps of the alternate implementation of the high-level logic flowchart function as described herein.

Figure 2E:
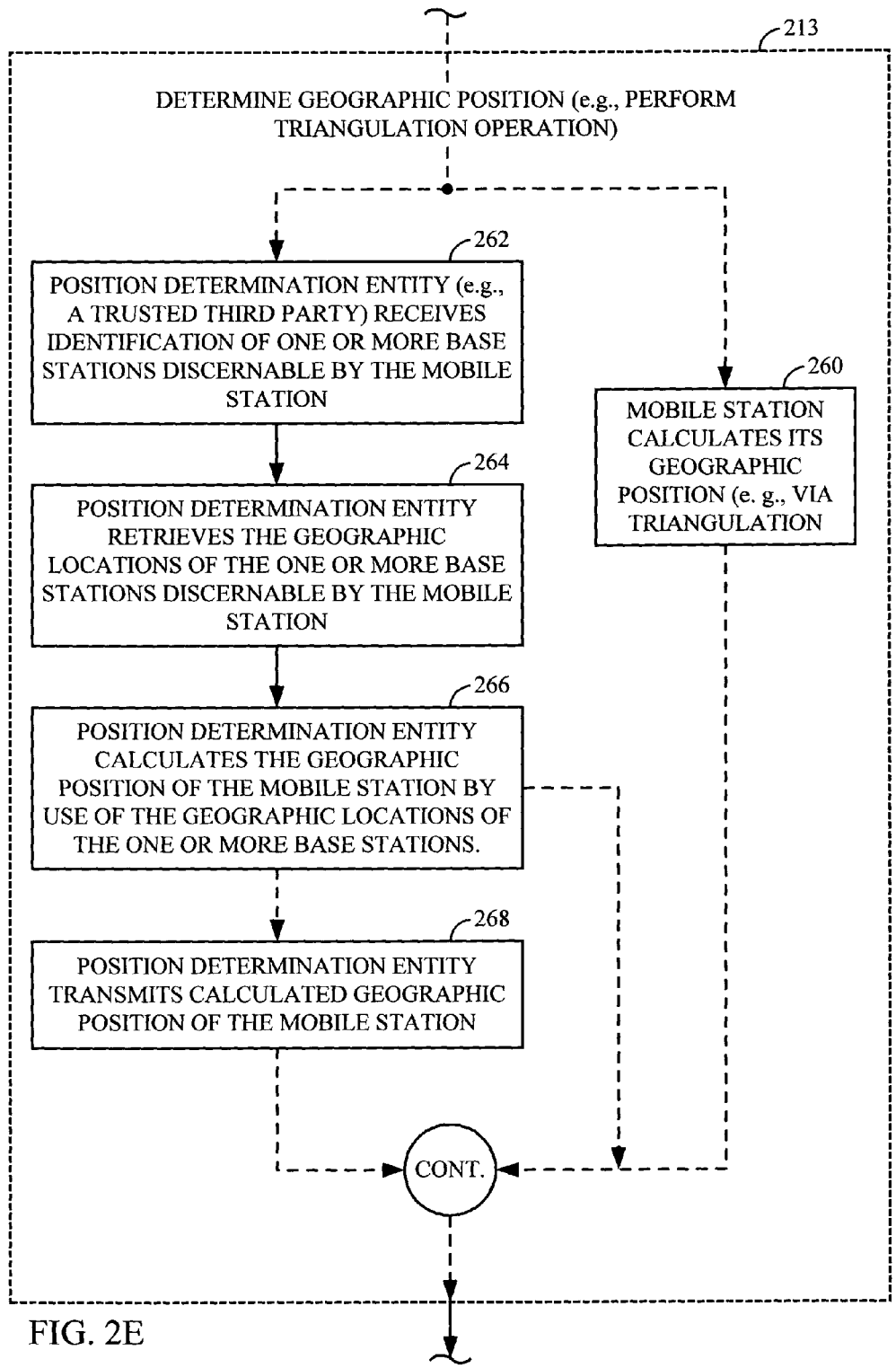
FIG. 2E is a high-level logic flowchart depicting alternate implementations of the high-level logic flowchart of FIG. 2A.

FIG. 2E is a high-level logic flowchart depicting alternate implementations of the high-level logic flowchart of FIG. 2A. As illustrated, step 213 includes a number of sub-step 260. In step 260, the mobile station 102 calculates its own geographic position (e.g., via a triangulation calculation). The remaining steps of the alternate implementation of the high-level logic flowchart function as described herein.

Also as illustrated, step 213 includes a number of sub-steps 262–266. In step 262, a Position Determination Entity (e.g., a Trusted Third Party) receives identification of one or more base stations discernable by mobile station 102. In step 264, the Position Determination Entity receives the geographic locations of the one or more base stations discernable by mobile station 102. In step 266, the Position Determination Entity calculates the geographic position of the mobile station 102 by use of the geographic locations of the one or more base stations. The remaining steps of the alternate implementation of the high-level logic flowchart function as described herein.

As further illustrated, 213 includes a number of sub-steps 262–268. In step 268, the Position Determination Entity transmits the calculated geographic position of the mobile station (e.g., back to the mobile station itself, or to another computational entity at or near a base station). In this alternate implementation, steps 262–266 function as described previously. The remaining steps of the alternate implementation of the high-level logic flowchart function as described herein.

Figure 2F:
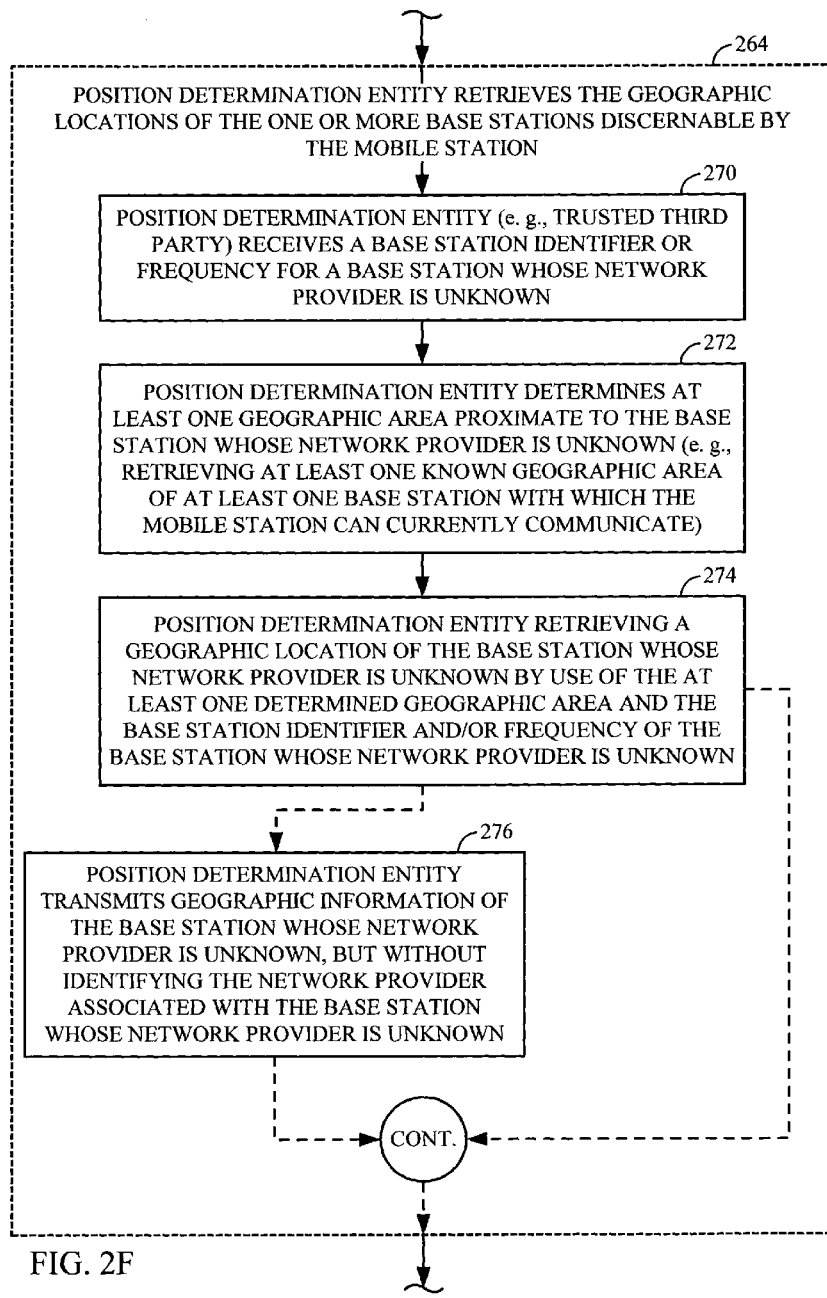
FIG. 2F is a high-level logic flowchart depicting an alternate implementation of the high-level logic flowchart of FIG. 2E, as well as an implementation in its own right.

FIG. 2F is a high-level logic flowchart depicting an alternate implementation of the high-level logic flowchart of FIG. 2E, as well as an implementation in its own right. As illustrated, step 264 includes a number of sub-steps 270–274. In step 270, the Position Determination Entity (e.g., a Trusted Third Party or a Position Determination Entity resident in mobile station 102's home network) receives a base station identifier or frequency for a base station whose network provider is unknown. In step 272, the Position Determination Entity determines at least one geographic area proximate to the base station whose network provider is unknown; for example, by retrieving at least one known geographic area of at least one base station with which mobile station 102 can currently communicate, such as the coordinates of a base station in mobile station 102's home network. In step 274, the Position Determination Entity retrieves a geographic location of the base station whose network provider is unknown by use of the at least one determined geographic area and the base station identifier and/or frequency of the base station whose network provider is unknown. The remaining steps of the alternate implementation of the high-level logic flowchart function as described herein.

As illustrated, in yet another implementation step 213 includes a number of sub-steps 270–276. In step 276, the Position Determination Entity transmits the geographic information of the base station whose network provider is unknown, but without identifying the network provider associated with the base station whose network provider is unknown (e.g., as was described herein in relation to the trusted third party concept). In this alternate, steps 270–274 function as described previously. The remaining steps of the alternate implementation of the high-level logic flowchart function as described herein.

As can be seen by reference to FIGS. 2A–2F, there are many different alternate possible paths through the high-level logic flowcharts of FIGS. 2A–2F. Following are a few examples showing how various of the paths could be employed within the context of the illustrated exemplary environment 100.

Figure 3A:
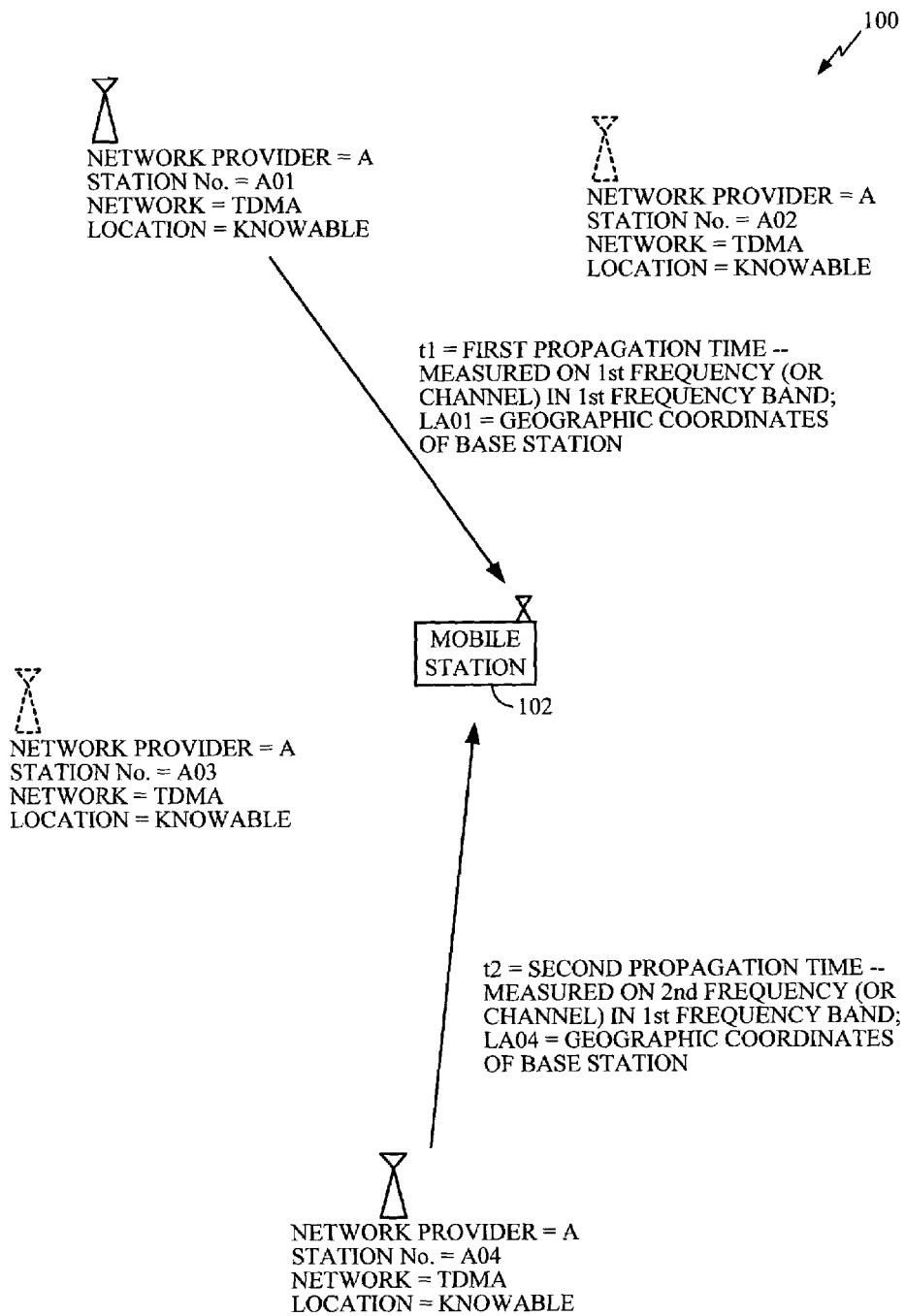
FIGS. 3A–4B are schematic diagrams illustrating an example of a mobile station performing some of the previously-described method steps of FIGS. 2A–2F in an environment.
Figure 3B:
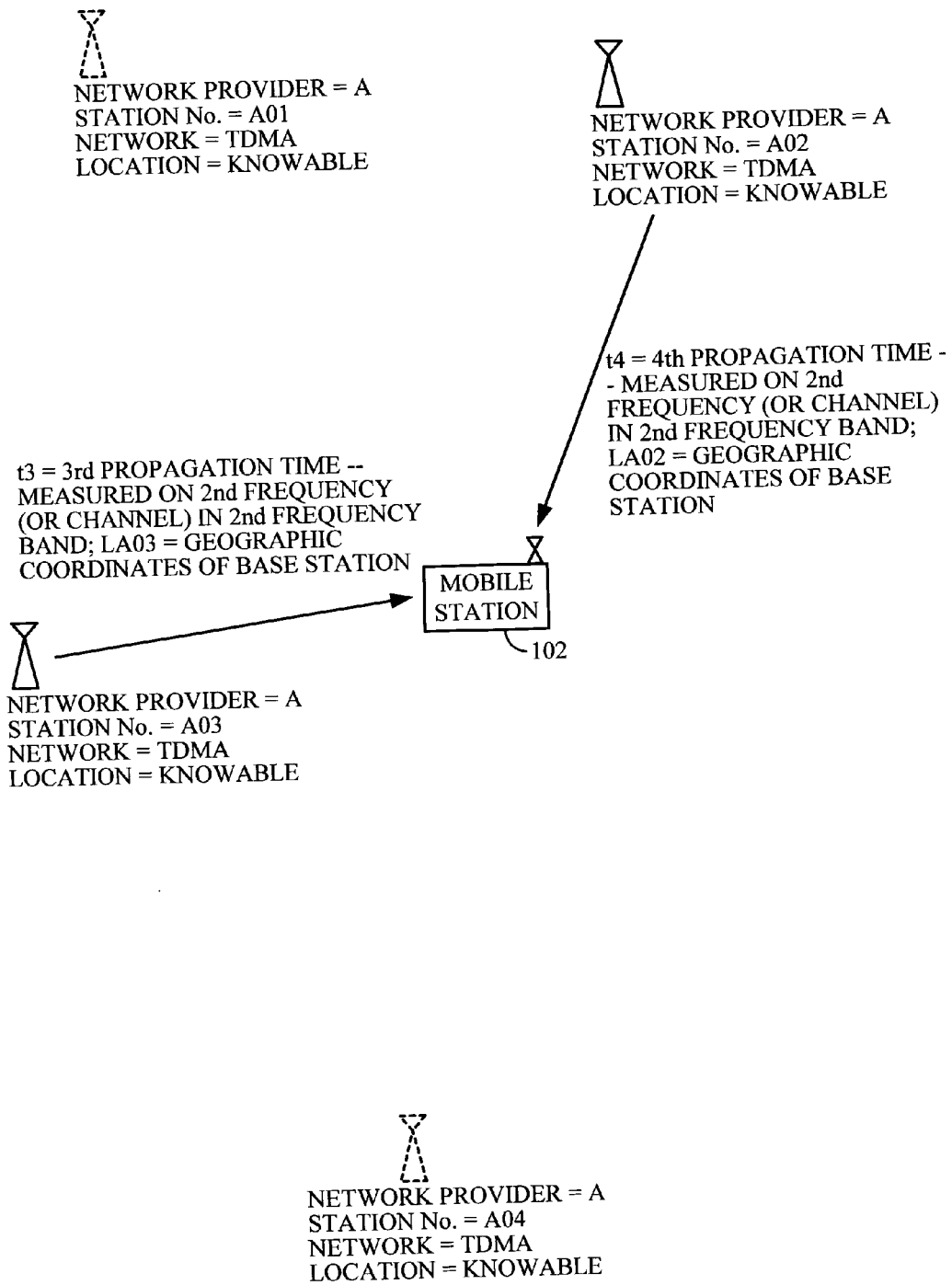

FIGS. 3A–3B illustrate the mobile station 102 performing some of the previously-described steps of FIGS. 2A–2F in the environment 100. For sake of illustration, the mobile station 102 is assumed to be a multimode, multiband, wireless phone that has selected TDMA as its current mode of operation (e.g., selected TDMA or GSM mode, as in step 202 of the method illustrated in FIG. 2A). The mobile station 102 has also selected a first frequency band (e.g., selected a first frequency band as in step 203 of the method illustrated in FIG. 2A), which happens to be a frequency band belonging to the TDMA network of network provider A, and on which the base stations A01 and A04 of network provider A are operating. (Base stations A02 and A03 of network provider A are operating in a separate frequency band as illustrated by use of broken lines, and hence cannot currently be "seen" by mobile station 102, although they would be within range of mobile station 102 should the mobile station 102 switch to the corresponding frequency band upon which the base stations A02 and A03 are operating).

Further, the mobile station 102 has selected a first frequency in the first-selected frequency band (e.g., selected a first channel such as in step 204 of FIG. 2A). As illustrated in FIG. 3A, the mobile station 102 uses the first-selected frequency to determine a first propagation time, t1, for radio transmission between base station No. A01 of network provider A and the mobile station 102 itself via any of a number of techniques well known to those having ordinary skill in the art (e.g., by pinging the base station No. A01). Those having ordinary skill in the art will appreciate that once the propagation time t1 is known, the distance of mobile station 102 from the base station can be calculated using the velocity of radio wave propagation (e.g., the speed of light in air). The mobile station 102 also determines the geographical location, LA01 (e.g., the geographical coordinates such as longitude and latitude), of the base station A01 of the network provider A, which in some implementations is received directly from network provider A, and which in other implementations is received from a trusted third party as described herein.

Subsequent to the mobile station 102 determining the first propagation time t1 (and hence the distance from network provider A's base station A01), and the location LA01 of network provider's base station A01, the mobile station 102 selects a second channel in the first-selected frequency band (e.g., as in step 212 of the method of FIG. 2A). Using the second-selected frequency in the first-selected frequency band, the mobile station 102 determines a second propagation time, t2, for radio transmission between base station No. A04 of the network provider A and the mobile station 102 itself, via any of a number of techniques well known to those having ordinary skill in the art (e.g., by "pinging" the base station No. A04). The mobile station 102 also determines the geographical location, LA04 (e.g., the geographical coordinates such as longitude and latitude), of network provider A's base station A04, which in some implementations is received directly from network provider A, and which in other implementations is received from a trusted third party as described herein.

Note that at this point mobile station 102 knows the distance from itself to two known geographic locations (e.g., the geographic locations of base stations A01 and A04). Consequently, assuming that mobile station 102 is using triangulation to determine its geographic position, mobile station 102 does not yet have enough information to localize its geographic position (e.g., the determination of step 210—does mobile station 102 have enough information to localize its geographical position—would be answered in the negative).

As can be seen by reference to FIG. 2A, in some implementations, should a third channel be available in the first-selected frequency band, it is possible for mobile station 102 to select and process upon that third-selected channel. However, assume for sake of illustration that, subsequent to mobile station 102 determining t2 (and hence the distance from network provider A's base station A04) and the location LA04 of network provider's base station A04, mobile station 102 determines that the third channel is NOT available in the first-selected frequency band. Consequently, the process can optionally select a new frequency band or a new mode.

Assuming, for sake of illustration, that mobile station 102 elects to switch to a new frequency band (e.g., as illustrated in step 218 of FIG. 2A) to attempt to obtain additional information necessary to localize its geographical position. An example of such an operation is shown in FIG. 3B.

FIG. 3B illustrates the mobile station 102 selecting a second frequency band (e.g., as in step 216), which happens to be a frequency band belonging to the TDMA network of network provider A, and on which the base stations A02 and A03 of the network provider A are operating. (Note that the network provider A's A01 and A04 base stations are operating in the first-selected frequency band, and hence cannot currently be "seen" by mobile station 102, although they are in range of mobile station 102). The mobile station 102 selects a first frequency in the second-selected frequency band (e.g., as in step 204, when step 204 follows upon the performance of step 218). The mobile station 102 determines a third propagation time t3 for radio transmission between base station No. A03 of network provider A and the mobile station 102 itself via any of a number of techniques well known to those having ordinary skill in the art (e.g., by pinging the base station No. A03). Those having ordinary skill in the art will appreciate that once the propagation time is known the distance of mobile station 102 from the base station can be calculated. The mobile station 102 also determines the geographical location LA03 (e.g., the geographical coordinates) of network provider A's base station A03, which in some implementations is received directly from network provider A, and which in other implementations is received from a trusted third party as described herein.

Thus, the mobile station 102 knows the distance from itself to three known geographic locations (e.g., the geographic locations of base stations A01, A03, and A04). Consequently, assuming that mobile station 102 is using triangulation to determine its geographic position, the mobile station 102 now has sufficient information to localize its geographic position (e.g., the determination of step 210—does mobile station 102 have enough information to localize its geographical position—would be answered in the affirmative).

Subsequent to mobile station 102 determining t3 (and hence the distance from network provider A's base station A03) and the location LA03 of network provider's base station A03, mobile station 102 has sufficient information to localize its geographic position via triangulation (e.g., the inquiry of method step 210 would be answered in the affirmative). Even though the mobile station 102 has sufficient information to triangulate, the mobile station 102 determines that a second channel is available in the first-selected frequency band and selects that second frequency in the second-selected frequency band (e.g., as would happen where the determination of step 214—is it desired that accuracy be increased—is answered in the affirmative and where the process proceeded on to the performance of step 218).

The mobile station 102, using the second-selected frequency in the second-selected frequency band, determines a fourth propagation time t4 for radio transmission between base station No. A02 of the network provider A and the mobile station 102 itself via any of a number of techniques well known to those having ordinary skill in the art (e.g., by pinging the base station No. A02). The mobile station 102 also determines the geographical location, LA02 (e.g., the geographical coordinates), of network provider A's base station A02, which in some implementations is received directly from network provider A, and which in other implementations is received from a trusted third party as described herein.

As noted above in the FIG. 2A, in various paths through the high-level logic flowchart of FIG. 2A, it is possible for mobile station 102 to switch to another mode of operation and thereafter localize its (mobile station 102's) geographic position in that other mode. Operations illustrative of the foregoing are shown and described following in FIGS. 4A–B, which continue to build upon the examples set forth in FIGS. 3A–B.

Figure 4A:
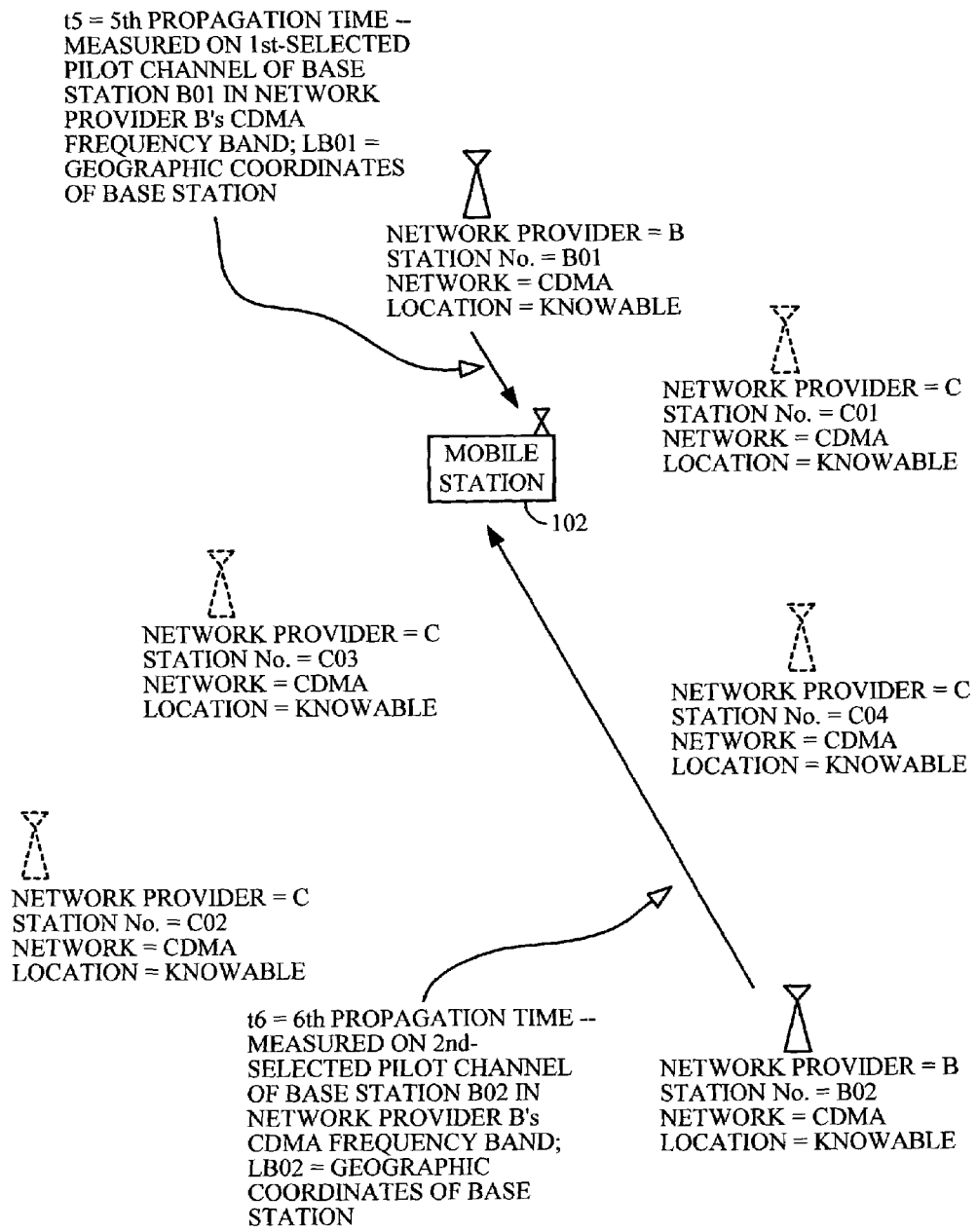

FIG. 4A shows the mobile station 102 (assumed for sake of illustration to be a multimode, multiband, cellular phone) having selected CDMA as its current mode of operation (e.g., selected CDMA mode in step 202 of FIG. 2A). Further, the mobile station 102 has selected a first frequency band belonging to the network provider B (e.g., selected a first frequency band in step 203), which happens to be a frequency band belonging to the CDMA network of the network provider B, and on which network provider B's B01 and B02 base stations are operating. The base stations C01–C04 of network provider C are operating in a separate frequency band, and hence cannot currently be "seen" by mobile station 102, as illustrated via use of broken lines, although they would be within range of mobile station 102, should mobile station 102 tune to their CDMA frequency band.

The mobile station 102 selects a first pilot channel in the first-selected frequency band (e.g., selected a first channel in step 204). The mobile station 102 uses that first-selected pilot channel to determine a first propagation time t5 for radio transmission between network provider B's base station No. B01 and itself (mobile station 102) via any of a number of techniques well known to those having ordinary skill in the art (e.g., by determining the chip offset of the received pilot channel relative to another known/received pilot channel (not shown)). Those having ordinary skill in the art will appreciate that once the propagation time t5 is known, the distance of mobile station 102 from the base station can be calculated. The mobile station 102 also determines the geographical location LB01 (e.g., the geographical coordinates such as longitude and latitude) of network provider B's base station B01, which in some implementations is received directly from network provider B, and which in other implementations is received from a trusted third party as described herein.

Subsequent to the mobile station 102 determining the propagation time t5 (and hence the distance from network provider B's base station B01), and the location LB01 of network provider's base station B01, the mobile station 102 selects a second pilot channel in the first-selected frequency band belonging to network provider B (e.g., as in step 212). The mobile station 102, using the second-selected pilot channel in the first-selected frequency band, determines a sixth propagation time t6 for radio transmission between network provider B's base station No. B02 and itself (mobile station 102) via any of a number of techniques well known to those having ordinary skill in the art (e.g., by determining the chip offset of the received pilot channel relative to another known/received pilot channel)). The mobile station 102 also determines the geographical location LB02 (e.g., the geographical coordinates such as longitude and latitude) of the base station B02 of the network provider B, which in some implementations is received directly from network provider B, and which in other implementations is received from a trusted third party as described herein.

At this point mobile station 102 knows the distance from itself to six known geographic locations (e.g., the distances from the geographic locations of base stations A01, A02, A03, and A04, as described in relation to FIGS. 3A–B, and the distances from the geographic locations of base stations B01 and B02, as described in relation to FIG. 3A). Consequently, assuming that mobile station 102 is using triangulation to determine its geographic position, the mobile station 102 has sufficient information to localize its geographic position (e.g., the inquiry depicted in step 210—does mobile station 102 have enough information to localize its geographical position—would be answered in the affirmative).

Figure 4B:
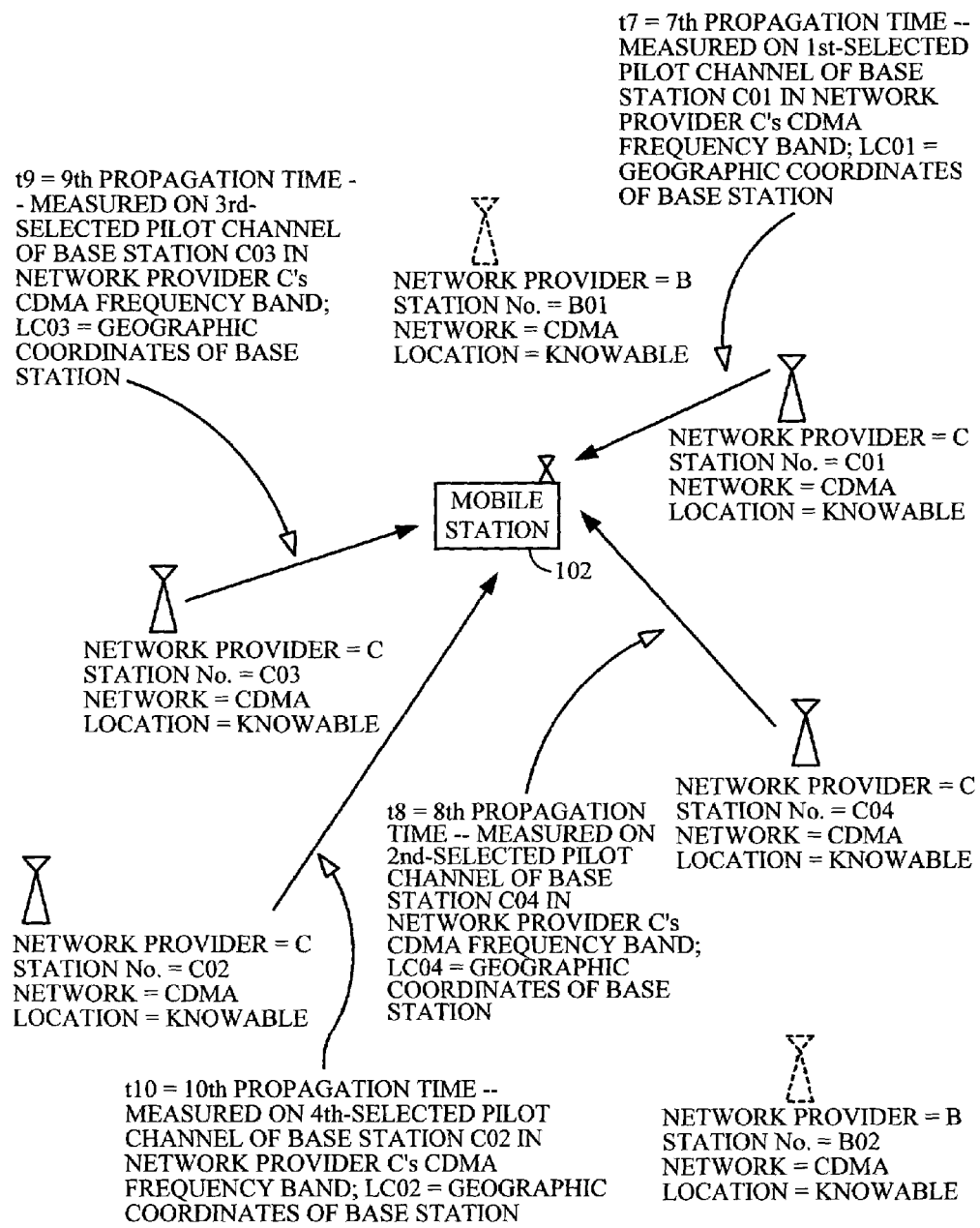

FIG. 4B shows that, subsequent to mobile station 102 determining t6 (and hence the distance from network provider B's base station B02) and the location LB02 of network provider's base station B02, mobile station 102 has more than sufficient information to localize its geographic position via triangulation (e.g., the inquiry of step 210 would be answered in the affirmative). Even though mobile station 102 has sufficient information to triangulate, mobile station 102, which is still in the selected mode of CDMA, determines that yet more localization accuracy is desired. Hence the mobile station 102 selects a second CDMA frequency band belonging to network provider C (e.g., as would happen where the inquiry in step 214—is it desired that accuracy be increased—is answered in the affirmative and where the process proceeded on to the performance of step 218), which happens to be a frequency band belonging to network provider C's CDMA network, and on which network provider C's C01, C02, C03 and C04 base stations are operating. The base stations B01 and B02 base stations of network provider B are operating in a separate frequency band, and hence cannot currently be "seen" by mobile station 102, as illustrated by the broken lines, although they would be within range of mobile station 102, should mobile station 102 tune to their frequency band.

The mobile station 102 selects a first pilot channel in the second-selected frequency band (e.g., selected a first channel in step 204, when step 204 follows upon step 218). The mobile station 102 uses the first-selected pilot channel to determine a first propagation time t7 for radio transmission between the base station No. C01 of the network provider C and the mobile station 102 itself via any of a number of techniques well known to those having ordinary skill in the art (e.g., by determining the chip offset of the received pilot channel relative to another known/received pilot channel. Those having ordinary skill in the art will appreciate that once the propagation time t7 is known, the distance of mobile station 102 from the base station can be calculated. The mobile station 102 also determines the geographical location LC01 (e.g., the geographical coordinates such as longitude and latitude) of the base station C01 of the network provider C, which in some implementations is received directly from network provider C, and which in other implementations is received from a trusted third party as described herein.

Subsequent to the mobile station 102 determining t7 (and hence the distance from network provider C's base station C01), and the location LC01 of network provider C's base station C01, the mobile station 102 sequentially selects a second, third, and fourth pilot channel in the second-selected frequency band belonging to network provider C (e.g., as in step 212) using techniques analogous to those described elsewhere herein. Using the second, third, and fourth selected pilot channel in the second-selected frequency band, respectively, the mobile station 102 determines a eighth, ninth, and tenth propagation times, t8, t9, and t10, for radio transmission between network provider C's base station No. C04, C03, and C02 and mobile station 102 itself via any of a number of techniques well known to those having ordinary skill in the art (e.g., by determining the chip offset of the received pilot channel relative to another known/ received pilot channel)). The mobile station 102 also respectively determines the geographical location, LC04, LC03, and LC02 (e.g., the geographical coordinates such as longitude and latitude), of network provider B's base station B02, which in some implementations is received directly from network provider B, and which in other implementations is received from a trusted third party as described herein. Thereafter, it may be assumed that the determination of step 215—is accuracy desired beyond that currently available—is answered in the negative and that the example depicted in FIGS. 3A–4B ends.

The inventors point out that their herein-described processes and devices give rise to several benefits, a few of which will now be listed. One benefit derives from the ability, provided by certain of the herein described schemes, to switch to another CDMA frequency and search for base stations, which will sometimes alleviate instances of what is known in the art as the near-far problem. Another benefit derives from the ability, provided by certain of the herein described schemes, to switch to another frequency, within a pre-chosen frequency band, and search for base stations, which will sometimes tend to alleviate problems associated with fading; specifically, with problems associated with the fact that different frequencies tend to fade substantially independently of each other when propagating over distances. Another benefit derives from the ability, provided by certain of the herein described schemes, to switch to another frequency band, within a pre-chosen wireless mode, and search for base stations, which will sometimes tend alleviate problems associated with fading. Another benefit derives from the fact that, in hybrid systems which utilize GPS to help locate mobile stations, many times the GPS signal is not receivable (e.g., inside many buildings), and hence, since the current scheme improves accuracy utilizing available base stations, the current schemes described herein can help hybrid systems, which utilize GPS in addition to base stations, to approach the accuracy associated with GPS even when the GPS signal is not available.

In the addition to the foregoing, the inventors would like to reiterate a point made above. That is, many times, the mobile station itself will not perform position location, but rather such position location will be done in computational entities resident within or near base stations, or resident within a computer network which interfaces with base stations. For example, most of the time those who are most interested in position location are associated with the 911 emergency rescue system. Specifically, new regulations require that prior to a network provider routing a call from a mobile station to the 911 system, the network provider must localize the position of the mobile station prior to routing such call, and provide the position location to the 911 system when the call is subsequently routed. Accordingly, although, in some instances, position location operations have been explained herein as done by the mobile station for sake of simplicity and ease of understanding, those skilled in the art will recognize that in most applications the position location computations will at least partially be performed in computational entities which reside in physical devices other than the mobile station. As explained above, from the standpoint of the subject matter of the present application, if a certain physical device has circuitry which performs at least a part of the process described herein, for all intents and purposes that device can be viewed as performing all of the various computations and/or operations which may be distributed among the various physical devices, since where such computations are actually physically done is a design choice of the system designer.

The inventors point out that while examples herein have discussed position location by use of three-measurement triangulation, it will also be recognized that certain examples illustrated increasing the accuracy of triangulation by use of more than three points. Consequently, those having ordinary skill in the art will recognize that that term "triangulation," as used herein, is meant to be illustrative of position location techniques which utilize other than three measurements. In addition, while triangulation examples have been discussed herein for sake of illustration, those having ordinary skill in the art will recognize that more complex position location techniques exist, such as those that will take as many measurements as available and use weighted computations to obtain the position location. Consequently, those having ordinary skill in the art will appreciate that, as used herein, triangulation is meant to be exemplary of other, more complex, methods of position location known to those of ordinary skill in the art. Lastly, the inventors point out that the accuracy of the position location solutions can be determined by many other methods known to those having ordinary skill in the art.

Those having ordinary skill in the art will recognize that the scheme described herein can be utilized in many different devices which make up wireless communications systems analogous to those described herein. For example, the schemes described herein will prove useful in one or more of the wireless communication devices which tend to characterize wireless communications systems, such as wireless phones (e.g., TDMA, CDMA, or other type cellular phones), wireless modems, wireless pagers, and wireless base station equipment. Incorporating the schemes described herein into such devices may be done, in light of the teachings herein, via an ordinary amount of experimentation well within the ambit of one having ordinary skill in the art.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various implementations of the devices and/or processes via the use of block diagrams, flowcharts, and examples. Insofar as such block diagrams, flowcharts, and examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, the disclosed subject matter may be implemented via Application Specific Integrated Circuits (ASICs). However, those skilled in the art will recognize that the implementations disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the disclosed subject matter are capable of being distributed as a program product in a variety of forms, and that an illustrative embodiment of the disclosed subject matter applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular implementations of the disclosed subject matter have been shown and described, those skilled in the art will recognize, based upon the teachings herein, that changes and modifications may be made without departing from the disclosed subject matter and its broader aspects and, therefore, the appended claims are to encompass within their scope all such changes and modifications as are within the true spirit and scope of this disclosed subject matter.

Another special case system that can be successfully used in this method is proposed HDR network. As 1x-EV standard is evolving it is clear that IS2000-1x and HDR networks are meant to co-exist together and MS will take advantage of both networks depending on the service type. It will use HDR for data and 1x system for voice. In this case functionality will already include some sort of searching and monitoring both systems, co-located or not. So, HDR is a natural choice (when available) for a proposed method to improve position location.

Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A method for localizing a mobile station, said method comprising:

logging one or more wireless channels which belong to one or more network providers other than the mobile station's home network provider and which substantially currently provide communication with one or more discernable base station comprising:

selecting a previously unselected wireless mode of the mobile station; and logging one or more previously unselected wireless mode channels which provide communication with the one or more discernable base stations, said logging irrespective of the one or more network providers to whom the channels belong; and establishing a geographic position of the mobile station by use of the one or more wireless channels which belong to the one or more network providers other than the mobile station's home network provider.

2. The method of claim 1 wherein the mobile station's home network provider comprises:

a network provider selected from the network-provider group which includes a substantially permanently assigned home network provider and a substantially temporarily assigned roaming network provider.

3. The method of claim 1, further comprising:

repeating said selecting and logging until substantially all wireless modes of the mobile station have been selected.

4. The method of claim 1 wherein said previously unselected wireless mode is one of an AMPS mode, an FDMA mode, a TDMA mode, a GSM mode, a WCDMA mode, an HDR mode, or a CDMA mode.

5. The method of claim 1 wherein said establishing a geographic position of the mobile station by use of the one or more wireless channels which belong to the one or more network providers other than the mobile station's home network provider comprises:

determining a propagation time of a transmission on a channel which provides communication between a discernable base station and the mobile station.

6. The method of claim 1 wherein said establishing a geographic position of the mobile station by use of the one or more wireless channels which belong to the one or more network providers other than the mobile station's home network provider comprises:

determining a geographic location of at least one discernable base station.

7. The method of claim 6 wherein said determining a geographic location of at least one discernable base station comprises:

receiving the geographic location of the at least one discernable base station from the mobile station's home network provider.

8. The method of claim 6 wherein said determining a geographic location of at least one discernable base station comprises:

receiving the geographic location of the at least one discernable base station from the at least one discernable base station's network provider.

9. The method of claim 6 wherein said determining a geographic location of at least one discernable base station comprises:

receiving the geographic location of the at least one discernable base station via a trusted third party.

10. The method of claim 1 wherein said establishing a geographic position of the mobile station by use of the one or more wireless channels which belong to the one or more network providers other than the mobile station's home network provider comprises:

sending identification of one or more base stations discernable by the mobile station to a position determination entity; and receiving the geographic position of the mobile station from the position determination entity.

11. The method of claim 10 wherein said position determination entity comprises a trusted third party.

12. The method of claim 1 wherein said mobile station comprises a multi-mode wireless device.

13. A method for localizing a mobile station, said method comprising:

logging one or more wireless channels which belong to one or more network providers other than the mobile station's home network provider and which substantially currently provide communication with one or more discernable base stations, including selecting a previously unselected wireless frequency band of the mobile station; and logging one or more previously unselected wireless frequency band channels which provide communication with the one or more discernable base stations, said logging irrespective of the one or more network providers to whom the channels belong.

14. The method of claim 13, further comprising:

repeating said selecting and logging until substantially all wireless frequency bands of the mobile station have been selected.

15. The method of claim 13 wherein the mobile station's home network provider comprises:

a network provider selected from the network-provider group which includes a substantially permanently assigned home network provider and a substantially temporarily assigned roaming network provider.

16. The method of claim 13 wherein said establishing a geographic position of the mobile station by use of the one or more wireless channels which belong to the one or more network providers other tan the mobile station's home network provider comprises:

determining a propagation time of a transmission on a channel which provides communication between a discernible base station and the mobile station.

17. The method of claim 13 wherein said establishing a geographic position of the mobile station by use of the one or more wireless channels which belong to the one or more network providers other than the mobile station's home network provider comprises:

determining a geographic location of at least one discernable base station.

18. The method of claim 17 wherein said determining a geographic location of at least one discernable base station comprises:

receiving the geographic location of the at least one discernable base station from the mobile station's home network provider.

19. The meted of claim 17 wherein said determining a geographic location of at least one discernable base station comprises:

receiving the geographic location of the at least one discernable base station from the at least one discernable base station's network provider.

20. The method of claim 17 wherein said determining a geographic location of at least one discernable base station comprises:

receiving the geographic location of the at least one discernable base station via a trusted third party.

21. The method of claim 13 wherein said establishing a geographic position of the mobile station by use of the one or more wireless channels which belong to the one or more network providers other than the mobile station's home network provider comprises:

sending identification of one or more base stations discernable by the mobile station to a position determination entity; and receiving the geographic position of the mobile station from the position determination entity.

22. The method of claim 21 wherein said position determination entity comprises a trusted third party.

23. The method of claim 13 wherein said mobile station comprises a multi-mode wireless device.

24. A method for localizing a mobile station, said method comprising:

selecting a first wireless mode of the mobile station;

logging one or more first wireless mode channels which provide communication with one or more discernable base stations, said logging irrespective of one or more network providers to whom the first wireless mode channels belong, including selecting a previously unselected channel of the first wireless mode;

actively or passively monitoring the previously unselected channel of the first wireless mode for base station activity;

logging the results of said actively or passively monitoring the previously unselected channel of the first wireless mode; and repeating said selecting, monitoring, and logging until substantially all channels of the first wireless mode have been selected, establishing a geographic position of the mobile station by use of the logged one or more first wireless mode channels.

25. The method of claim 24, wherein said establishing a geographic position of the mobile station by use of the logged one or more first wireless mode channels comprises:

performing a triangulation operation based at least in part on the logged one or more first wireless mode channels.

26. The method of claim 24, wherein said establishing a geographic position of the mobile station by use of the logged one or more first wireless mode channels comprises:

performing a triangulation operation based at least in part on a first channel drawn from a first-selected frequency band and a second channel drawn from a second-selected frequency hand.

27. The method of claim 24, wherein said establishing a geographic position of the mobile station by use of the logged one or more first wireless mode channels comprises:

performing a triangulation operation based at least in part on a first channel and a second channel drawn from a previously selected frequency band.

28. The method of claim 24, wherein said establishing a geographic position of the mobile station by use of the logged one or more first wireless mode channels comprises:

selecting a second wireless mode of the mobile station;

logging one or more second wireless mode channels which provide communication with one a more discernable base stations, said logging irrespective of one or more network providers to whom the second wireless mode channels belong; and establishing a geographic position of the mobile station by use of the logged one or more second wireless mode channels and the logged one or more first wireless mode channels.

29. A method for localizing a mobile station, said method comprising:

selecting a first wireless mode of the mobile station;

logging one or more first wireless mode channels which provide communication with one or more discernable base stations, said logging irrespective of one or more network providers to whom the first wireless mode channels belong; and establishing a geographic position of the mobile station by use of the logged one or more first wireless mode channels, comprising selecting a previously unselected channel of a second wireless mode;

actively or passively monitoring the previously unselected channel of the second wireless made for base station activity;

logging the results of said actively or passively monitoring the previously unselected channel of the second wireless mode; and repeating said selecting, monitoring, and logging until substantially all channels of the second wireless mode have been selected.

30. The method of claim 29, wherein said establishing a geographic position of the mobile station by use of the logged one or more first wireless mode channels comprises:

performing a triangulation operation based at least in pan on the logged one or more first wireless mode channels.

31. The method of claim 29, wherein said establishing a geographic position of the mobile station by use of the logged one or more first wireless mode channels comprises:

performing a triangulation operation based at least in part on a first channel drawn from a first-selected frequency band and a second channel drawn from a second-selected frequency band.

32. The method of claim 29, wherein said establishing a geographic position of the mobile station by use of the logged one or more first wireless mode channels comprises:

performing a triangulation operation based at least in part on a first channel and a second channel drawn from a previously selected frequency band.

33. The method of claim 29, wherein said establishing a geographic position of the mobile station by use of the logged one or more first wireless mode channels comprises:

selecting a second wireless mode of the mobile station;

logging one or more second wireless mode channels which provide communication with one or more discernable base stations, said logging irrespective of one or more network providers to whom the second wireless mode channels belong; and establishing a geographic position of the mobile station by use of the logged one or more second wireless mode channels and the logged one or more first wireless mode channels.

34. A system for localizing a mobile station, said system comprising:

means for selecting a first wireless mode of the mobile station;

means for logging one or more first wireless mode channels which provide communication with one or more discernable base stations, said logging irrespective of one or more network providers to whom the first wireless mode channels belong said logging means including means for selecting a previously unselected channel of the first wireless mode;

means for actively or passively monitoring the previously unselected channel of the first wireless mode for base station activity;

means for logging the results of said means for actively or passively monitoring the previously unselected channel of the first wireless mode; and means for activating said means for selecting, monitoring, and logging until substantially all channels of the first wireless mode have been selected; and means for establishing a geographic position of the mobile station by use of the logged one or more first wireless mode channels.

35. The system of claim 34, wherein said means for logging one or more first wireless mode channels which provide communication with one or more discernable base stations, said logging irrespective of one or more network providers to whom the first wireless mode channels belong comprises:

means for selecting a previously unselected channel of the first wireless mode;

means for actively or passively monitoring the previously unselected channel of the first wireless mode for base station activity;

means for logging the results of said means for actively or passively monitoring the previously unselected channel of the first wireless mode; and means for activating said means for selecting, monitoring, and logging until substantially all channels of the first wireless mode have been selected.

36. The system of claim 34, wherein said means for establishing a geographic position of the mobile station by use of the logged one or more first wireless mode channels comprises:

means for performing a triangulation operation based at least in part on the logged one or more first wireless mode channels.

37. A system for localizing a mobile station, said system comprising:

means for selecting a first wireless mode of the mobile station;

means for logging one or more first wireless mode channels which provide communication with one or more discernable base Stations, said logging irrespective of one or more network providers to whom the first wireless mode channels belong; and means for establishing a geographic position of the mobile station by use of the logged one or more first wireless mode channels, including means for selecting a second wireless mode of the mobile station;

means for logging one or more second wireless mode channels which provide communication with one or more discernable base stations, said logging irrespective of one or more network providers to whom the second wireless mode channels belong;

means for establishing a geographic position of the mobile station by use of the logged one or more second wireless mode channels and the logged one or more first wireless mode channels;

means for selecting a previously unselected channel of the second wireless mode;

means for actively or passively monitoring the previously unselected channel of the second wireless mode for base station activity;

means for logging the results of said means for actively or passively monitoring the previously unselected channel of the second wireless mode; and means for activating said means for selecting, monitoring, and logging until substantially all channels of the second wireless mode have been selected.

38. The system of claim 37, wherein said means for logging one or more first wireless mode channels which provide communication with one or more discernable base stations, said logging irrespective of one or more network providers to whom the first wireless mode channels belong comprises:

means for selecting a previously unselected channel of the first wireless mode;

means for actively or passively monitoring the previously unselected channel of the first wireless mode for base station activity;

means for logging the results of said means for actively or passively monitoring the previously unselected channel of the first wireless mode; and means for activating said means for selecting, monitoring, and logging until substantially all channels of the first wireless mode have been selected.

39. The system of claim 37, wherein said means for establishing a geographic position of the mobile station by use of the logged one or more first wireless mode channels comprises:

means for performing a triangulation operation based at least in part on the logged one or more first wireless mode channels.

* * * * *